(12) United States Patent
Duncan

(10) Patent No.: US 6,484,329 B1
(45) Date of Patent: Nov. 26, 2002

(54) BLADDER-CONTROLLED STOPPER DEVICE

(76) Inventor: Scott Duncan, 3515 Plantain Ct., Santa Rosa, CA (US) 95403

( * ) Notice: Subject to any disclaimer, the term of this patent is extended or adjusted under 35 U.S.C. 154(b) by 0 days.

(21) Appl. No.: 09/834,148

(22) Filed: Apr. 12, 2001

Related U.S. Application Data

(63) Continuation-in-part of application No. 09/769,103, filed on Jan. 24, 2001, now abandoned.

(51) Int. Cl.7 .......................... E03C 1/00; F16K 31/145
(52) U.S. Cl. .................. 4/671; 4/672; 4/688; 4/673; 251/61.1
(58) Field of Search ................... 4/688, 671, 672, 4/673, 287; 251/61.1, 61; 92/34

(56) References Cited

U.S. PATENT DOCUMENTS

| | | | | |
|---|---|---|---|---|
| 2,843,154 A | * | 7/1958 | Hosking | |
| 2,882,007 A | * | 4/1959 | Conlan | 92/34 |
| 2,886,281 A | * | 5/1959 | Canalizo | 251/61.1 |
| 3,595,255 A | * | 7/1971 | Mulinex | |
| 3,802,449 A | * | 4/1974 | Mulinex | |
| 3,870,085 A | * | 3/1975 | Schneider | 138/93 |
| 4,006,754 A | * | 2/1977 | Houston | 251/61 |
| 4,182,371 A | * | 1/1980 | Moore | 251/61.1 |
| 4,475,255 A | * | 10/1984 | Tash | |
| 4,672,988 A | * | 6/1987 | Tash | 251/61.1 |
| 5,413,136 A | * | 5/1995 | Prescott | 251/61.1 |
| 5,771,937 A | * | 6/1998 | Collins | |

\* cited by examiner

*Primary Examiner*—Charles R. Eloshway
*Assistant Examiner*—Khoa Huynh

(57) ABSTRACT

A stopper for selectively blocking a drain to the passage of water. The drain has an inlet, an outlet and a substantially cylindrical throat between the inlet and outlet. A control means is provided for selectively feeding control fluid under hydraulic pressure to the cylindrical throat whereupon an expandable bladder located within the cylindrical throat selectively expands in fluid communication with the control fluid to block the drain and thus act as a stopper.

6 Claims, 6 Drawing Sheets

BLADDER-CONTROLLED STOPPER DEVICE

RELATED APPLICATIONS

The present application is a continuation-in-part of U.S. application Ser. No. 09/769,103 filed on Jan. 24, 2001, now abandoned.

TECHNICAL FIELD OF THE INVENTION

The present invention involves a stopper device for selectively blocking a drain to the passage of water which employs a bladder rather than convention mechanical linkages. Such devices are more convenient to use than stoppers of the prior art and have the additional benefit that stoppers of the present invention comply with requirements of the Americans With Disabilities Act. Specifically, the stopper device of the present invention is capable of selectively blocking a drain to the passage of water and thus acts as a stopper for the drain which is capable of being manipulated by someone who is handicapped and thus incapable of actuating a traditional mechanical stopper of the prior art.

BACKGROUND OF THE INVENTION

Typical lavatories employ a pop-up linkage for mechanically blocking the drain thus acting as a stopper to selectively retain waste water. This linkage consists of four intersecting sharp abrasive surfaces that are not in any way shielded or covered. Such an assembly fails to comply with the Americans With Disabilities Act as Section 4.19.4 of the Act mandates that "there shall be no sharp or abrasive edges or elements under lavatory."

Further, in order to actuate the typical pop-up linkage as described above, one is required to generally reach beyond the normally provided water service control handle to grasp a vertically extending rod and to pull the rod upwards until the linkage acts to seat a stopper within the drain opening to which it is appended. Although the typically provided pop-up assembly is usable by the average person, even with the above-noted non-complying linkage, it would fail to comply with other requirements of the Americans With Disabilities Act. Specifically, Section 4.27.4 of the Act requires that controls and operating mechanisms be operable with one hand and do not require tight grasping, pinching or twisting of the wrist for actuation. The Act further provides that the force required to activate controls shall be no greater than five pounds per square foot. The typical pop-up linkage employed universally in the current plumbing trade meets none of these requirements. Many disabled individuals are incapable of grasping a vertically extending rod while providing sufficient grasping and pulling effort to successfully seat a stopper within a drain pipe through the linkage so provided. Further, even for lavatories having the mandated clearance for wheelchair access, the above noted linkage and its characteristic sharp edges can cause injury to a user.

In addition to the pop-up linkage found in lavatories, the trip lever employed in bath tub installations and basket strainers used in sinks also fail to comply with the Americans With Disabilities Act. Specifically, the bath tub trip lever which moves up and down controls water accumulation in the tub. Section 4.20.5 of the Act states, in part, that "all controls must be located at the foot of the tub, near the front edge of the wall, and below the grab bar . . ." Current trip levers are never so located; but the present invention can be so situated to meet the requirements of the Act. As to sink basket strainers, the Act states, in part, in Section 4.27.4, that actuation is limited to "5 lbs max. force." Certainly, as to a sink full of water, more than 5 lbs. force is required to remove the strainer basket against the retained water pressure in order to free the drain for waste water release. The present invention can also make sink drain assemblies compliant with the Act. Specifically the ADA looks to a "closed fist" as the standard for operating a sink. It is noted that current kitchen sinks require that baskets be pulled from the drain opening to release waste water. Thus, current kitchen drains would not comply with ADA requirements but the present invention would.

As noted above, the Act also prohibits linkages having sharp edges and corners from extending below a wall-hung seat assembly for those who are wheelchair-bound may very well injure their knees and legs when the wheelchair is brought proximate to the wall-hung sink.

In addition to, the first time, providing a stopper device which complies with the requirement of the Americans With Disabilities Act, it was an object of the present invention to provide a drain stopper which presents to a user a more elegant approach to selectively blocking the passage of waste water from a sink or tub facility.

It is a further object of the present invention to provide a stopper device for selectively blocking a drain to the passage of water which is capable of being employed by the disabled and which, as a consequence, meets the requirements of the Americans With Disabilities Act.

These and further objects will be more readily apparent when considering the following disclosure and appended claims.

SUMMARY OF THE INVENTION

The present invention is directed to a stopper device for selectively blocking a drain to the passage of water. The drain is provided with an inlet, an outlet and a substantially cylindrical throat between the inlet and outlet. Means are provided for selectively feeding control fluid under pressure from a pressurized fluid source to the cylindrical throat. An expandable bladder or inner tube-shaped expandable member is provided located within the cylindrical throat and in communication with the control fluid wherein the bladder is sized and positioned such that selective actuation of the means for selectively feeding control fluid causes the bladder to expand upon receipt of the control fluid in turn causing the drain to selectively block the passage of water therethrough.

DETAILED DESCRIPTION OF THE INVENTION

Figure 1:
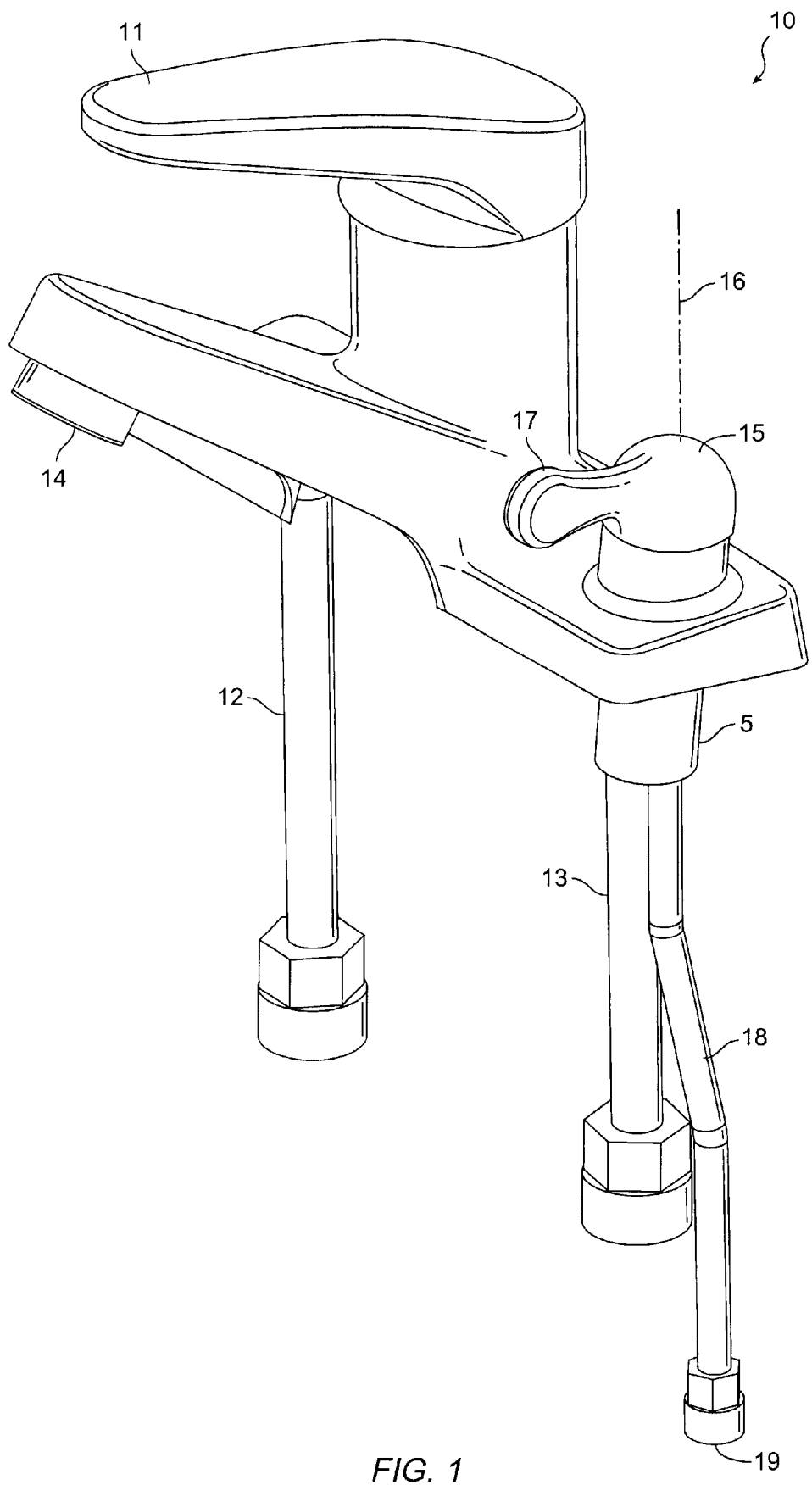
FIG. 1 is a perspective view of a control assembly for hot and cold water service to a basin, sink or tub employing the stopper device of the present invention.
Figure 2:
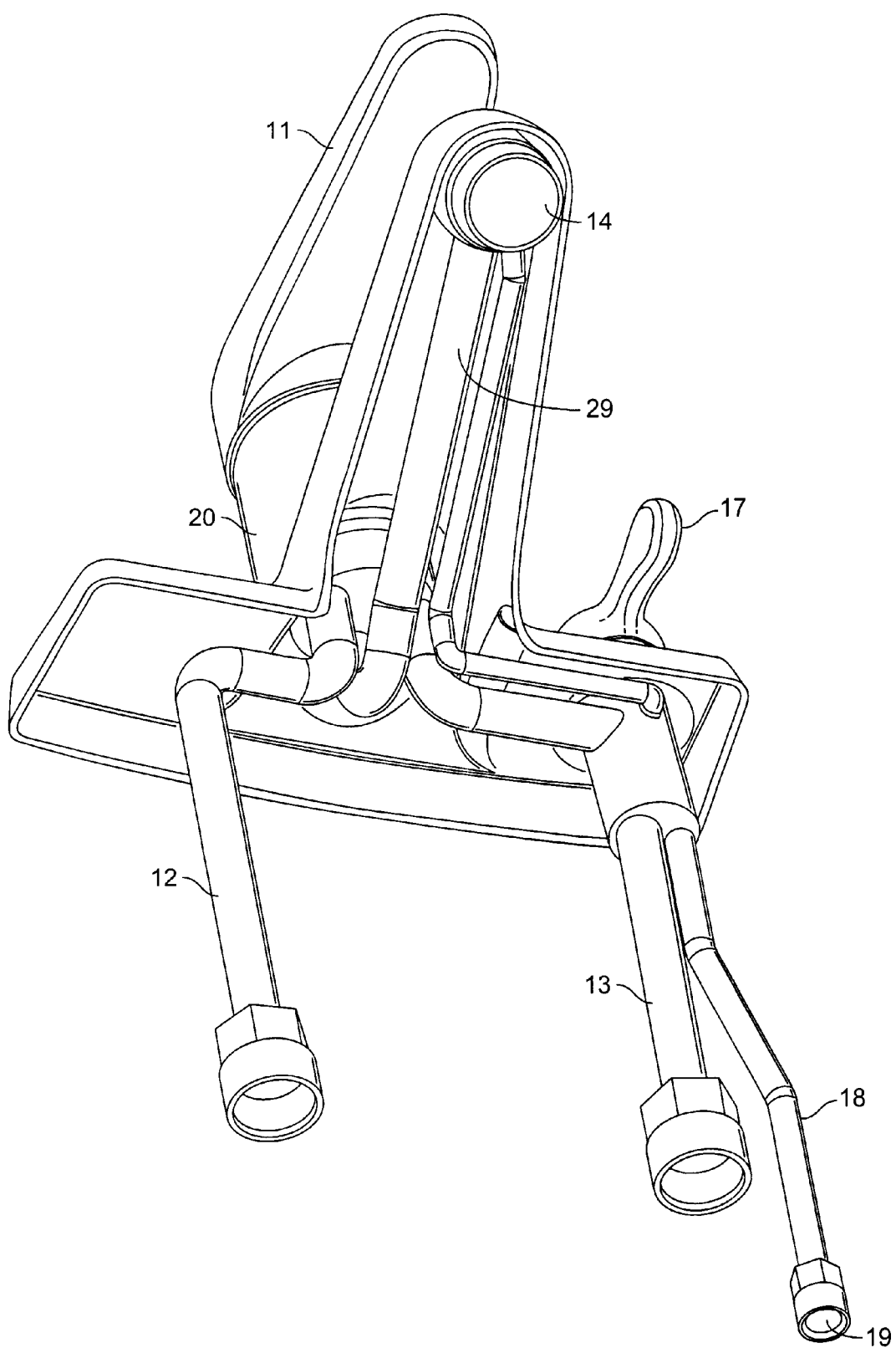
FIG. 2 is a further plan view of the assembly of FIG. 1.

FIG. 1 depicts water service assembly 10 for use with a lavatory including control handle 11 capable of lifting vertically for water service actuation and horizontally to adjust the temperature of water emanating from spigot 14 as a result of the mixture of hot and cold water entering control manifold 20 (FIG. 2) through inlet tubes 12 and 13, respectively. Although not shown, in the typical prior art installation, behind control handle 11 would generally be provided a pop-up rod which, when pulled vertically, acts upon a linkage generally provided behind a lavatory for drawing a plunger within a waste drain opening for selectively retaining waste water therein. However, such pop-up assemblies not only loosen as a result of their linkage but are difficult to manipulate by those who are handicapped. In fact, as noted above, the Americans With Disabilities Act specifically requires that controls and operating mechanisms of this type, to comply with statutory requirements, must be operable with one hand and not require a tight grasping, pinching or twisting of the wrist. Certainly, the typical prior art pop-up assembly does, in fact, require tight grasping and pinching for actuation.

In order to improve upon the lavatory pop-up linkage, tub trip lever or sink strainer basket of the prior art, and in order to provide a stopper device which meets the requirements of the Americans With Disabilities Act, the present invention has been provided. Specifically, in a first embodiment, the normally configured water service control assembly 10 is provided with a diverter valve 5 which can be actuated by control knob 15 by exerting lateral pressure upon handle 17 causing control knob 15 to rotate about axis 16. As such, diverter valve 5 can be actuated without the need for any type of grasping or pinching operation and, as noted below, is fully functional by even the handicapped.

Figure 3:
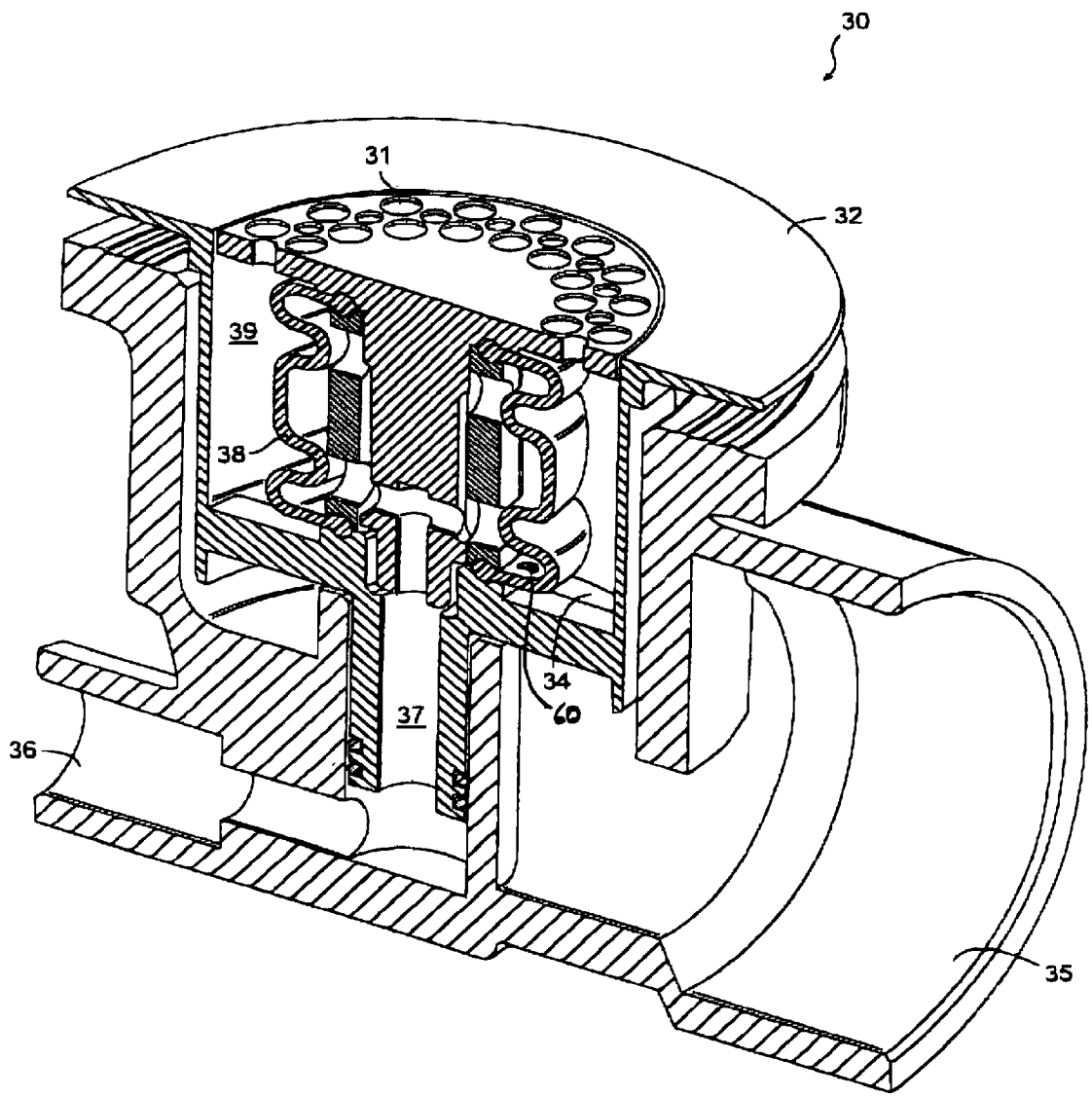
FIG. 3 is a perspective view in cross-section of a drain assembly used in conjunction with a typical tub assembly for carrying out the present invention.
Figure 4:
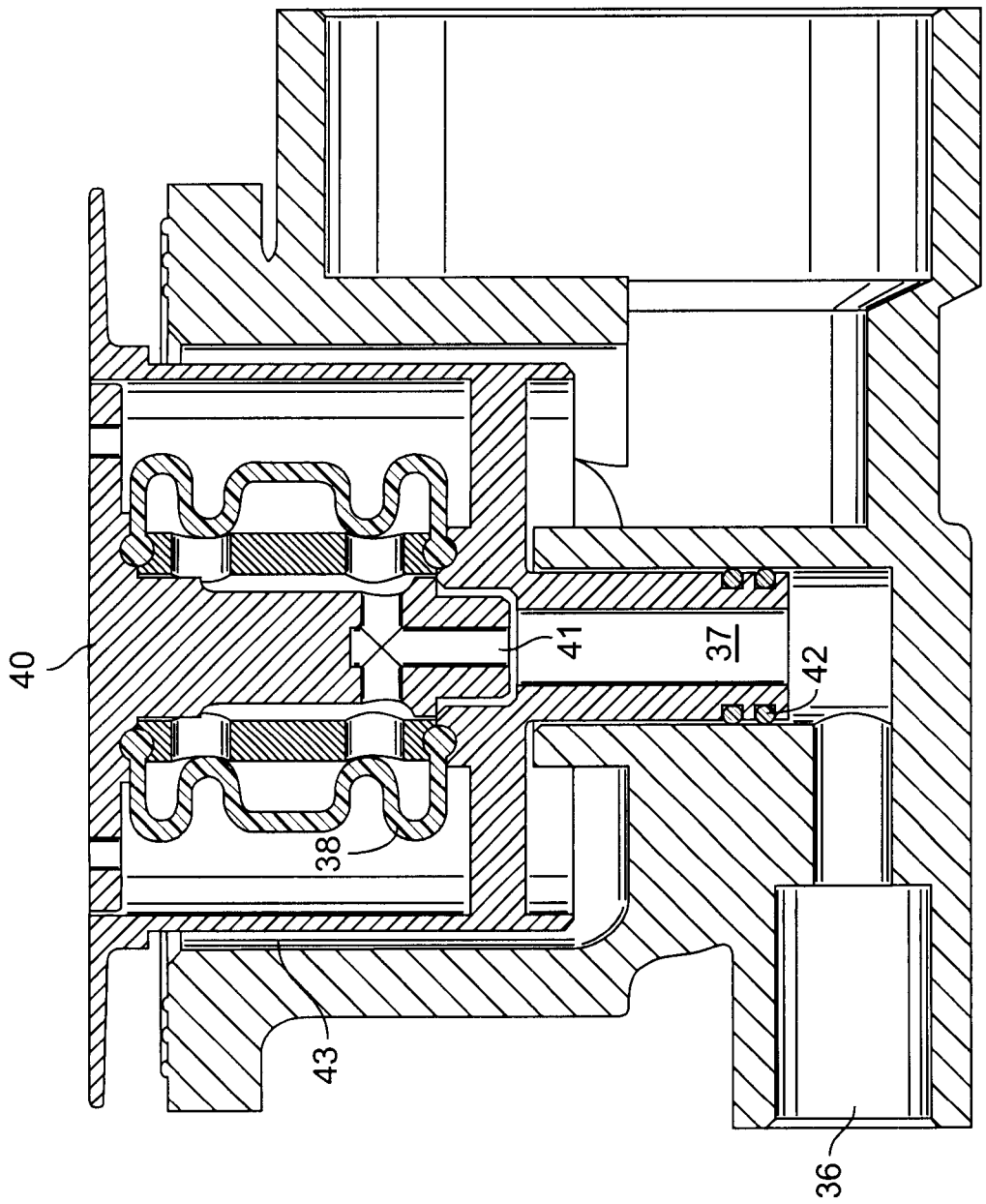
FIG. 4 is a cross-sectional view of the drain assembly of FIG. 3.

In operation, actuation of control knob 15 causes diverter valve 5 to channel cold water from cold water inlet pipe 13 under hydraulic pressure through bladder feed tube 18. Cold water under hydraulic then emanates from bladder feed tube 18 though outlet 19 to inlet 36 (FIGS. 3 and 4). Cold water under hydraulic pressure then emanates through passage 37 and T-channel 41 providing hydraulic pressure within bladder 38. As bladder 38 expands under hydraulic pressure, drain water normally passing through drain openings 31 and exiting through passageway 34 is blocked as bladder 38 expands within internal volume 39.

The assembly used in a typical tub installation is shown in FIGS. 3 and 4 and is elegant in its simplicity and is capable of adapting to pre-existing wastewater drain assemblies of typical sinks, lavatories and tubs.

Noting the structural elements of the present invention, strainer/bladder clamp 40 can be engaged at threaded interface 43 with liner tube 32 of the type traditionally found in the typical tub. O-rings 42 are configured as shown (FIG. 4) to provide watertight engagement.

It is noted that maintaining bladder 38 in an extended or flow blocking orientation, hydraulic pressure diverted from a hot or preferably cold water line through bladder feed tube 18 requires constant hydraulic pressure for bladder 38 is normally in a contracted state as shown in FIGS. 3 and 4. As such, as handle 17 of control knob 15 or its equivalent in a tub installation is returned to its original position through rotation about axis 16, water contained within bladder 38 is forced back through bladder feed tube 18 and vents through a tub equivalent of spout 14.

As an alternative embodiment, a two-way diverter valve can be employed which provides for diversion of either hot or preferably cold water to bladder 38 without allowing for the passage of water contained within bladder 38 from re-entering center of manifold 20. This embodiment prevents unsanitary water from entering manifold 20 and operates by configuring a small bleed hole 60 (FIG. 3) within bladder 38 such that when hydraulic pressure is removed from bladder 28, it reduces its internal volume, much like a balloon with a hole in its sidewall.

Figure 5:
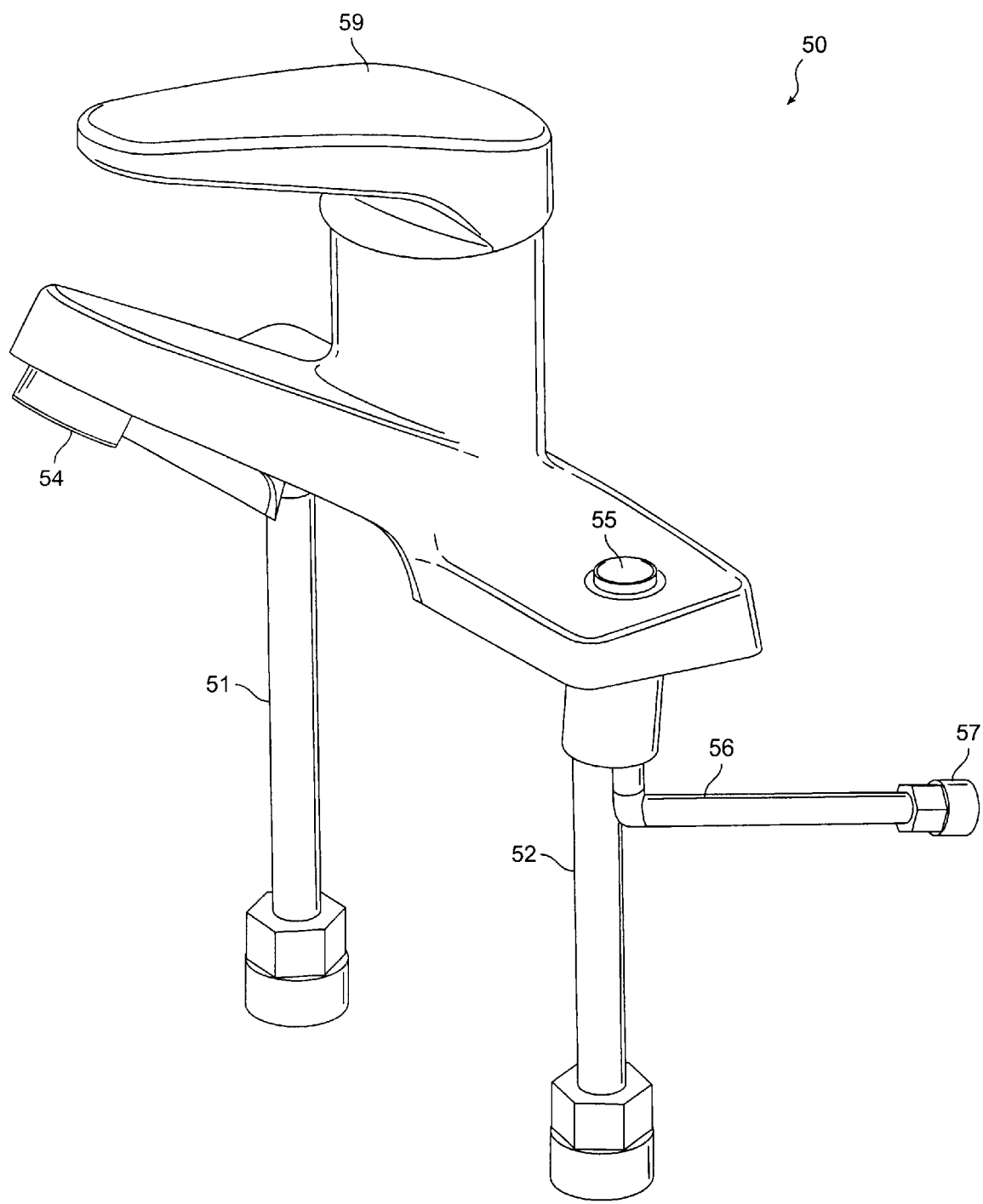
FIG. 5 is a perspective view of a typical drain employing the present invention using an air compressor rather than the diverter valve of the previous embodiments.

As a further alternative, reference is made to FIG. 5 showing water service assembly 50 for use with a lavatory. As in the embodiment shown in FIG. 1, control handle 59 is provided capable of lifting vertically for water service actuation and horizontally to adjust the temperature of water emanating from spigot 54 as a result of the mixture of hot and cold water entering control manifold 50 through inlet tubes 51 and 52, respectively. In place of the pop-up rod traditionally located behind the control handle or diverter valve 5 shown previously, an air pressure source such as mini air compressor 57 is provided to introduce pressurized air through tube 58 to a bladder such as bladder 38 of FIGS. 3 and 4. An electric switch activated by user button 55 can be used to engage mini air compressor 57, whereupon air can be introduced to bladder 38 (FIG. 3) to expand its internal volume. When turned off, also, by pressing user button 55, bladder 38 will reduce in size as air is bled therefrom. As a further alternative, mini air compressor 57 can be engaged by passing either hot or cold water from lines 51 or 52, respectively, past a turbine, thus eliminating the need for an electrical connection.

It is noted by referenced to FIG. 6 that generic source 60 is provided as a pressurized fluid source functionally connected to inlet 36 as shown. Pressurized fluid source 60 can comprise any of a number of expedients well known to those skilled in the art of providing devices powered by fluid pressure as a means of selectively expanding bladder 38. For example, reference is made to FIGS. 6A through 6D as devices which can be placed at the location of generic pressurized fluid source 60 as shown.

Figure 6A:
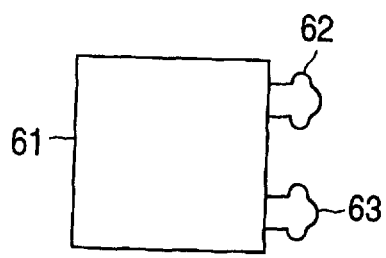
FIGS. 6A–6D represent schematic depictions of various examples of pressurized fluid sources capable of being employed for use in the present invention.
Figure 6B:
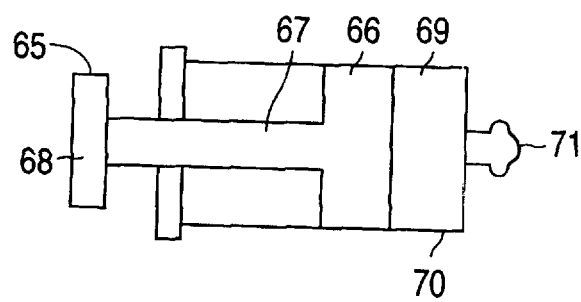

FIG. 6A is directed to a schematic of an electrical fluid pump 61 having inlet 62 and outlet 63. Outlet 63 can be used to feed fluid such as water or compressed air to bladder 38 expanding bladder 38 to act as a stopper for the passage of water through the subject drain. Inlet 62 can be connected to a source of fluids such as water or air compressing the fluid for feeding it to bladder 38 under suitable pressure to accomplish the goals of the present invention. Bladder 38 can be contracted either by providing a bleed hole within its side wall so that bladder 38 only assumes its expanded configuration when electrical fluid pump 61 is provided fluid thereto under pressure. Alternatively, electric fluid pump 61 can be reversed causing fluid contained within bladder 38 under pressure to be drawn through pump 61 and out of inlet 62 again resulting in a contraction of bladder 38 and a freeing of the waste line to drainage.

As an alternative embodiment, mechanical fluid pump 65 can be provided as shown. This embodiment may be considered particularly commercially advantageous for mechanical fluid pump 65 could be placed in a vertical orientation behind the hot and cold water service to emulate a pop-up stopper while obviating the need for mechanical linkage of the prior art. Specifically, plunger 68 connected through stem 67 emanates in diaphragm 66 having a somewhat fluid engaging seal to side wall 70. As such, when plunger 68 is depressed, fluid contained within segregated region 69 can be placed under pressure forcing fluid through outlet 71 to inlet 36 thus expanding bladder 38. Similarly, plunger 68 can be withdrawn from region 69 causing fluid to be pulled from bladder 38 to reverse the process.

Figure 6C:
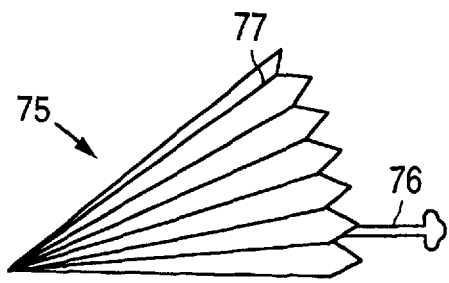

FIG. 6C depicts a simple bellows pump which could be foot actuated as a further means of assisting those who are disabled. Bellows pump 75 is provided with the typical accordion structure 77 and one-way air valve (not shown) such that when bellows pump 75 is depressed, its internal volume decreases forcing air through line 76 to fill bladder 38 under pressure. Air could be released from bladder 38 by anyone of the previously recited expedients including providing a bleed hole in its side wall.

Figure 6D:
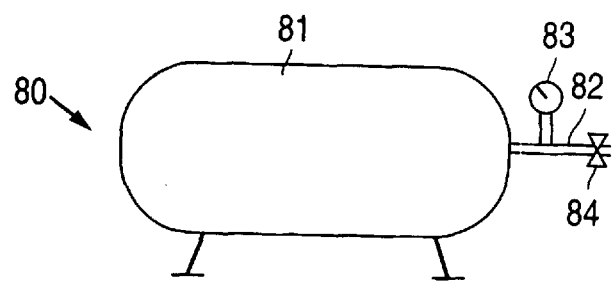

FIG. 6D depicts the schematic illustration of tank 80 as a compressed fluid source for use herein. Tank 80 containing virtually any type of compressible fluid, being gaseous or liquid, can be provided with valve 84 configured within exit stem 82. The pressure of compressed fluid source contained within tank 81 can be read from a standard pressure valve 83 and compressed fluid within tank 81 can be fed directly to bladder 38 by opening control valve 84 or by feeding the content of tank 81 to other previously described pressure control devices such as diverter 5 and electric fluid pump 61.

Through the practice of the present invention, for the first time, one is able to provide a stopper device for selectively blocking a drain which does not require grabbing onto a pop-up rod or similar mechanical expedient which, as noted previously, not only provides unacceptable challenges to the handicapped, but fails to meet the requirements of the Americans With Disabilities Act.

I claim:

1. A stopper device in combination with a sink or tub assembly for selectively blocking a drain assembly, said drain outlet having an inlet, an outlet, and a substantially cylindrical throat between said inlet and outlet, a pressurized fluid source, an expandable bladder further located within said cylindrical throat and in fluid communication with said pressurized fluid source; a means for selectively feeding water under pressure from said pressurized fluid source to said expandable bladder, wherein said bladder is sized and positioned such that selective actuation of said means for selectively feeding water under pressure causes said bladder to expand upon receipt of said water under pressure causing said drain outlet to selectively block the passage of water therethrough, wherein said means for selectively feeding water under pressure comprises a diverter valve.

2. The stopper device of claim 1 wherein hot and cold water service is supplied through a control manifold.

3. The stopper device of claim 2 wherein said water inder pressure is provided from said cold water service.

4. The stopper device of claim 1 wherein said diverter valve is actuatable by rotating a handle about a centrally located axis.

5. The stopper device of claim 4 wherein said handle is rotatable without need for use of fingers or thumb of a user.

6. The stopper device of claim 1 wherein said bladder is provided with an opening in its sidewall to enable said water under pressure to leak from said bladder causing said bladder to collapse when said water under pressure is no longer fed thereto to enable said drain outlet to pass water through said drain outlet.

* * * * *